US012614446B2

(12) United States Patent
Ligrani et al.

(10) Patent No.: US 12,614,446 B2
(45) Date of Patent: Apr. 28, 2026

(54) WEARABLE PANIC BUTTON

(71) Applicant: Intrado Life & Safety, Inc., Longmont, CO (US)

(72) Inventors: Nora Ligrani, Denver, CO (US); Brian Toolan, Longmont, CO (US)

(73) Assignee: Intrado Life & Safety, Inc., Longmont, CO (US)

( * ) Notice: Subject to any disclaimer, the term of this patent is extended or adjusted under 35 U.S.C. 154(b) by 306 days.

(21) Appl. No.: 18/216,250

(22) Filed: Jun. 29, 2023

(65) Prior Publication Data

US 2025/0006037 A1      Jan. 2, 2025

(51) Int. Cl.
| | |
|---|---|
| *G08B 25/01* | (2006.01) |
| *G08B 7/06* | (2006.01) |
| *G08B 21/02* | (2006.01) |
| *G08B 25/10* | (2006.01) |
| *G08B 25/12* | (2006.01) |
| *H04W 4/90* | (2018.01) |

(52) U.S. Cl.
CPC ............ *G08B 25/016* (2013.01); *G08B 7/06* (2013.01); *G08B 21/02* (2013.01); *G08B 25/10* (2013.01); *G08B 25/12* (2013.01); *H04W 4/90* (2018.02)

(58) Field of Classification Search
CPC ..... H04W 64/00; G06V 20/56; G06Q 10/083; G06Q 40/08; G08B 25/10
USPC ...................................................... 455/404.1
See application file for complete search history.

(56) References Cited

U.S. PATENT DOCUMENTS

| | | | | |
|---|---|---|---|---|
| 10,069,823 | B1 | 9/2018 | Chong et al. | |
| 11,716,605 | B2 * | 8/2023 | King-Berkman ..... | H04W 76/50 |
| | | | | 455/404.1 |
| 2004/0227629 | A1 * | 11/2004 | Adamczyk ........... | H04W 76/50 |
| | | | | 340/539.18 |
| 2005/0151642 | A1 * | 7/2005 | Tupler ................. | H04W 76/50 |
| | | | | 340/539.18 |
| 2009/0224889 | A1 * | 9/2009 | Aggarwal ............... | H04L 63/08 |
| | | | | 340/10.4 |
| 2010/0266129 | A1 * | 10/2010 | Tsuchiya ............. | H04M 3/5116 |
| | | | | 380/278 |
| 2014/0189808 | A1 * | 7/2014 | Mahaffey ........... | G06F 21/6245 |
| | | | | 726/4 |
| 2015/0289088 | A1 | 10/2015 | Terrazas | |
| 2016/0088463 | A1 | 3/2016 | Stanke et al. | |
| 2017/0142567 | A1 * | 5/2017 | Yamine ................... | H04W 4/90 |
| 2022/0383256 | A1 * | 12/2022 | Roh ....................... | G06Q 50/40 |
| 2023/0067239 | A1 * | 3/2023 | Palamadai ........... | A61B 5/0816 |

OTHER PUBLICATIONS

Non-Final Office Action in U.S. Appl. No. 18/535,409 dated Dec. 18, 2025, 19 pages.

* cited by examiner

*Primary Examiner* — Maria El-Zoobi
(74) *Attorney, Agent, or Firm* — PATENT CAPITAL GROUP

(57) ABSTRACT

A method includes receiving a configuration; receiving a panic signal; receiving an input; measuring a physical attribute to produce sensor data; determining an occurrence of an emergency event, at least in part based on the configuration and the input; transmitting telemetry data indicating the sensor data, at least in part based on the occurrence of the emergency event; and outputting an audio, visual, or haptic output, at least in part based on the panic signal.

14 Claims, 8 Drawing Sheets

Camera — 275

Display — 280

Microphone — 285

Thermometer — 290

Barometer — 295

Physical Attachment Unit — 240

Processor — 245

Device ID Unit — 250

Haptic Motor — 255

First Button — 260

Second Button — 265

LED — 270

Audio Output Unit — 205

Memory — 210

Battery — 215

First Communications Unit — 220

Second Communications Unit — 225

Third Communications Unit — 230

Fourth Communications Unit — 235

200

WEARABLE PANIC BUTTON

BACKGROUND

Technical Field

This disclosure relates to services specially adapted for wireless communication networks and, in particular, to services for handling emergency situations.

Related Art

In today's world, workplaces have become increasingly vulnerable to a wide range of threats, and employers have a duty of care to keep their employees safe. Workplace violence scenarios—from active shooter situations to domestic violence to random acts of violence—demand a supervisory response.

Some threats cannot be stopped by physical barriers, such as medical emergencies, gas leaks, explosions, and power outages. These threats can catch staff off guard and create chaos, when they are unprepared. Further, vandalism, theft, and suspicious activities can happen at any time in any location.

Conventionally, users can install applications on their personal smartphones for communication to public safety during an emergency. However, some users resist the installation of applications on their personal devices.

As an alternative, some people have demanded a wearable device. However, these wearable devices might not be developed with public safety in mind.

For example, these devices might prove inadequate with regards to communications. LTE and WiFi are not 100% reliable. In particular, older buildings that house schools might have dead spots arising from, e.g., the thickness of walls. Some buildings include BLE beacons that help to eliminate dead spots. However, the BLE beacons also are not 100% reliable. Further, devices in the basement of a building cannot receive a GPS (global positioning system) signal.

BRIEF SUMMARY

In one implementation of the present disclosure, a method is implemented by an apparatus and includes receiving a configuration; receiving a panic signal; receiving an input; measuring a physical attribute to produce sensor data; determining an occurrence of an emergency event, at least in part based on the configuration and the input; transmitting telemetry data indicating the sensor data, at least in part based on the occurrence of the emergency event; and outputting an audio, visual, or haptic output, at least in part based on the panic signal.

In another implementation of the present disclosure, an apparatus includes a wireless network interface that receives a configuration and receives a panic signal; a button that receives an input; a sensor that measures a physical attribute to produce sensor data; a processor configured to determine an occurrence of an emergency event, at least in part based on the configuration and the input, wherein the wireless network interface transmits telemetry data indicating the sensor data, at least in part based on the occurrence of the emergency event; and an output interface that outputs an audio, visual, or haptic output, at least in part based on the panic signal.

In yet another implementation of the present disclosure, a computer-readable medium includes instructions that, when executed by a processing unit, perform operations comprising: receiving a configuration; receiving a panic signal; receiving an input; measuring a physical attribute to produce sensor data; determining an occurrence of an emergency event, at least in part based on the configuration and the input; transmitting telemetry data indicating the sensor data, at least in part based on the occurrence of the emergency event; and outputting an audio, visual, or haptic output, at least in part based on the panic signal.

DETAILED DESCRIPTION

Figure 1:
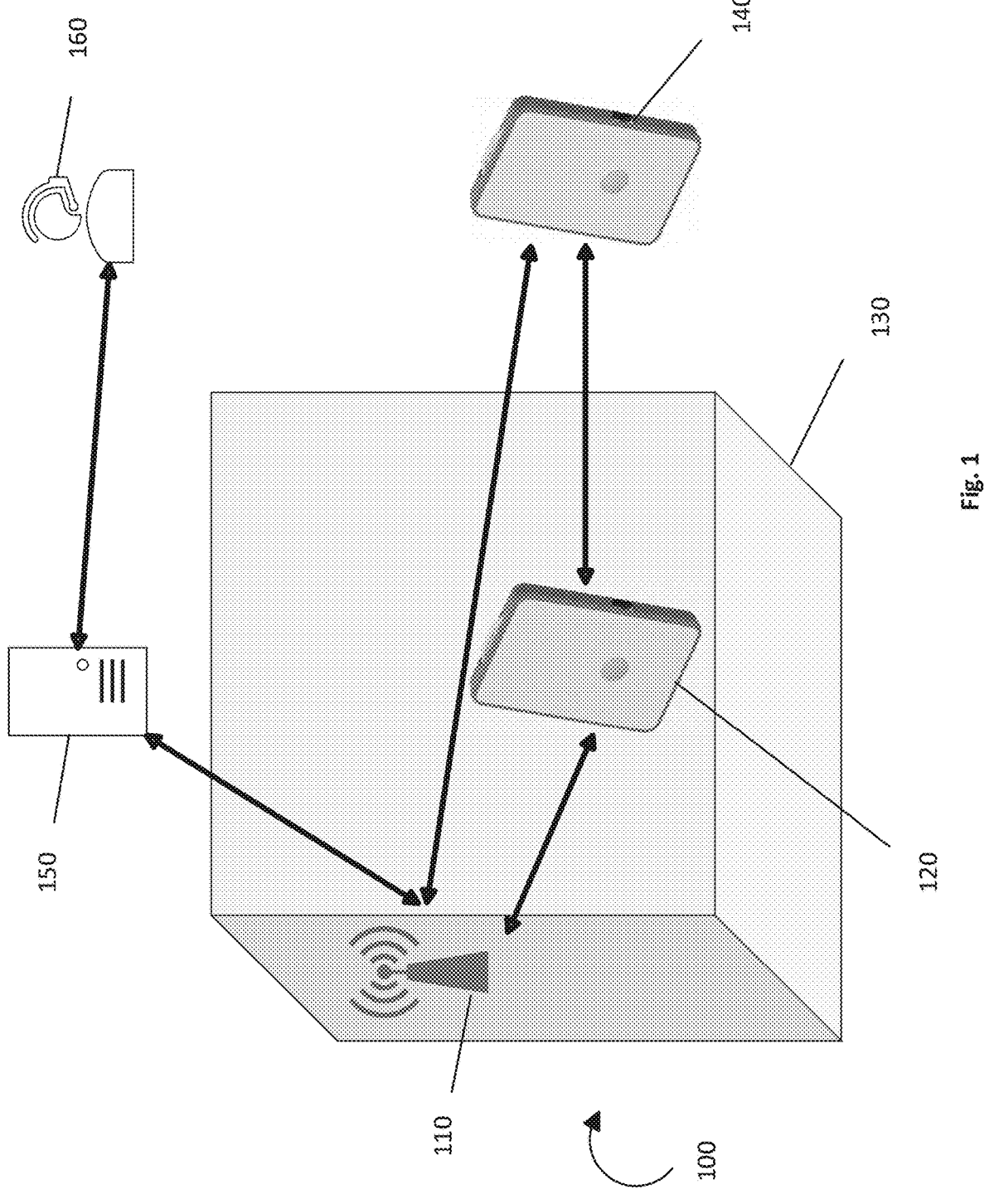
FIG. 1 illustrates an exemplary system, according to an implementation of the present disclosure.

FIG. 1 illustrates an exemplary system 100, according to an implementation of the present disclosure. The system 100 can be implemented, at least in part, based on wireless technology. The system 100 includes a beacon 110, a panic button device 120, a peer device 140, a management server 150, and a public safety access point (PSAP) 160.

The beacon 110 is installed on a wall of a room 130, such as a classroom or office. In the illustrated example, the panic button device 120 is located inside of the room 130, and the peer device 140 is located outside of the room 130.

In a typical use case, an emergency occurs in the room 130. The emergency can be an active shooter or a fire, as examples. Upon recognizing the emergency, a user (e.g., a teacher) in the room 130 presses one or more buttons on the panic button device 120. The panic button device 120 sends a keypress sequence and a device ID of the panic button device 120 to the beacon 110. The beacon 110 then forwards a message including an identifier of the beacon no and the keypress sequence to the management server 150.

The management server 150 then determines an event type of the keypress sequence. For example, one keypress sequence might indicate an active shooter, and a different keypress sequence might indicate a fire.

The management server 150 also can determine a role associated with the device ID.

Based on the event type, the management server 150 can send an emergency request to the PSAP 160. The emergency request can include an event type and location. In select implementations, the PSAP 160 can send an emergency response to the management server 150.

The management server 150 can send a panic signal to the beacon 110, which forwards the panic signal to the peer device 140 to inform its user of the emergency. The panic signal can include or indicate the event type.

Further, the management server 150 can send an EAM instruction, based on the event type and the role. The EAM instruction can indicate an operation for the user. Further, the EAM instruction can authorize the panic button device 120 to transmit the panic signal to the peer device 140.

The peer device 140 can include one or more output (e.g., audio, video, or haptic) interfaces. Thus, the peer device 140 can alert a human user of the emergency.

Both the panic button device 120 and the peer device 140 can include one or more sensors, such as a thermometer and/or a barometer. If the panic button device 120 or the peer device 140 transmits data from the sensor to the management server 150, the management server 150 can assess the proximity of the respective device to a phenomenon, such as a fire or tornado.

The decisionmaking can be centralized at the management server 150. The management server 150 can be configured to reflect the decisionmaking of the supervising authority (e.g., school principal or school district), the geography of the particular implementation (e.g., the class layout of the school), and the unfolding of the emergency.

The present disclosure often references the exchange of signals between the panic button device 120, the peer device 140, and the management server 150. Although explicit reference to the beacon 110 might not be presented, skilled artisans would understand that this signal exchange can occur via the beacon 110 in many implementations.

Figure 2:
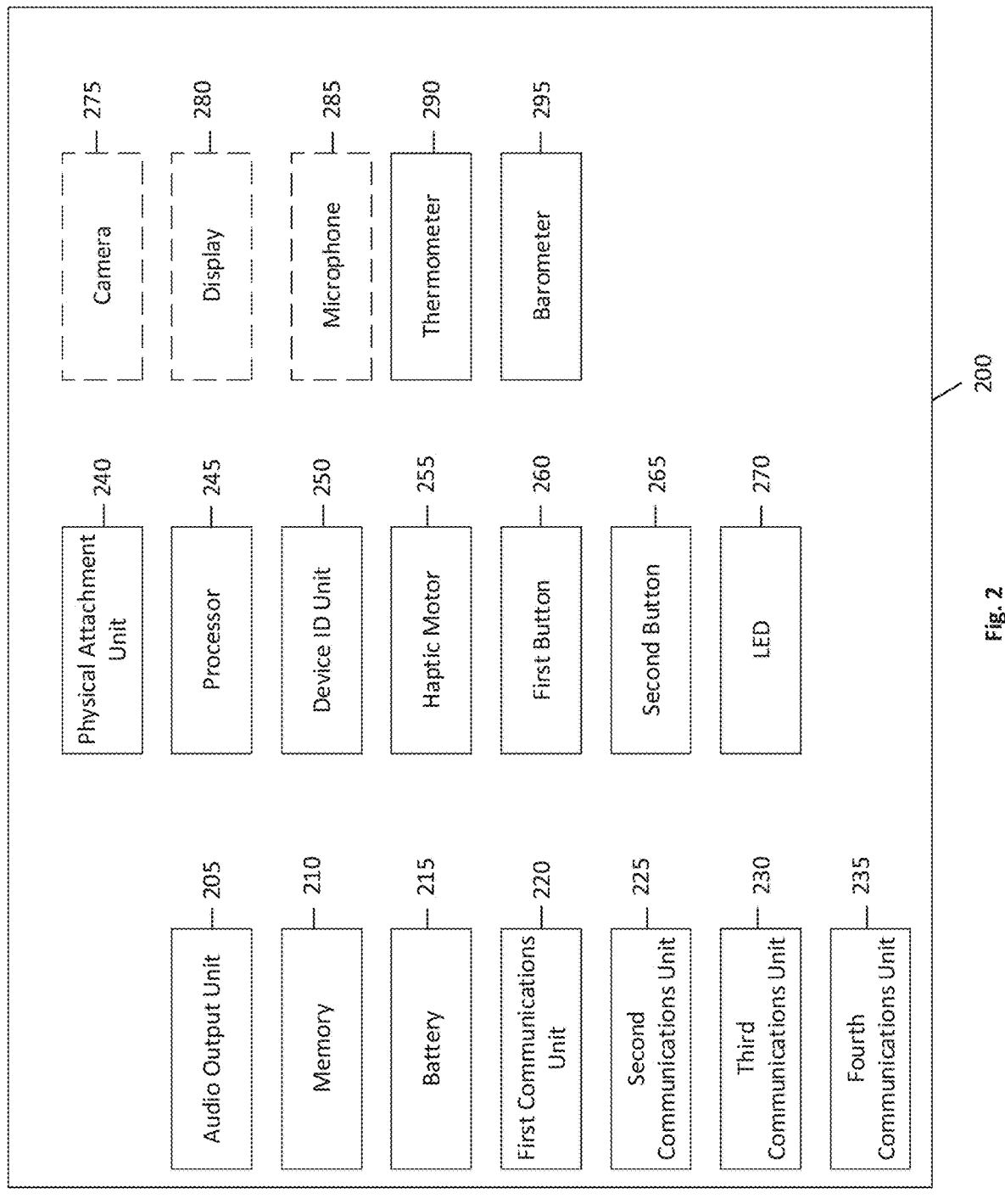
FIG. 2 illustrates an exemplary panic button device, according to an implementation of the present disclosure.

FIG. 2 illustrates an exemplary panic button device 200, according to an implementation of the present disclosure. The panic button device 120 and the peer device 140 are examples of the exemplary panic button device 200.

The panic button device 200 can include an audio output unit 205, a memory 210, a battery 215, one or more communications units 220, 225, 230, 235, a physical attachment unit 240, a processor 245, a device ID unit 250, a haptic motor 255, a first button 260, a second button 265, one or more light-emitting diodes (LEDs) 270, a camera 275, a display 280, a microphone 285, a thermometer 290, and a barometer 295. The panic button device 200 can be the size of an ID badge.

The audio output unit 205 can include a piezoelectric buzzer and/or a speaker. The audio output unit 205 can receive an audio signal from the processor 245. The audio output unit 205 can produce, based on the audio signal, sound waves audible to a person.

The memory 210 is a memory to which the processor 245 can store information and from which the processor 245 can retrieve the information. The memory 210 can be a random access memory (RAM), electronically-erasable programmable read-only memory (EEPROM), or hard drive. The memory 210 can be or incorporate other forms of memory as well, such as a cache memory.

The battery 215 can provide power to the components of the panic button device 200. In at least one implementation, the battery 215 is a single-use battery. In many implementations, the battery 215 is a rechargeable battery. For example, the battery 215 can be an extended-life, rechargeable battery that operates the panic button device 200 on only one charge per year.

The one or more communications units 220, 225, 230, 235 can receive and/or transmit wireless signals by which the panic button device 200 can communicate.

A first communications unit 220 can communicate via a wireless mobile telecommunications technology, such as 3G, and/or a wireless broadband communication technology, such as 3G long-term evolution (LTE) communications, 4G, 5G, or 6G. In many implementations, the first communications unit 220 can communicate via a cellular network. In various implementations, the first communications unit 220 includes or accesses a Subscriber Identity Module (SIM) card.

A second communications unit 225 can communicate via Bluetooth Low Energy (BLE) and/or Wi-Fi wireless network technology. In some implementations, the second communications unit 225 can communicate via CAT-M1 (Category M1). In many implementations, the second communications unit 225 differs from the first communications unit 220 in that the second communications unit 225 does not include or access a SIM card.

A third communications unit 230 can receive and/or transmit signals via a global navigation satellite system (GNSS). One example of a GNSS system includes the Global Positioning System (GPS). Other examples of a GNSS system include the Global Navigation Satellite System (GLONASS), the BeiDou Navigation Satellite System, Galileo, the Quasi-Zenith Satellite System (QZSS), and the Indian Regional Navigation Satellite System (IRNSS). The panic button device 200 can use the third communications unit 230 to produce a geolocation of the panic button device 200. The panic button device can then transmit the geolocation via another one of the communications units 220, 225, 235. In some implementations, the management server 150 can contact the GNSS to receive the geolocation of the panic button device 200.

A fourth communications unit 235 can communicate via an interoperable public safety broadband network, such as the First Responder Network (FirstNet). In many implementations, the fourth communications unit 235 includes or accesses a SIM card. Generally, the SIM card associated with the first communications unit 220 is different from the SIM card associated with the fourth communications unit 235. The fourth communications unit 235 can send data to and receive data from the public safety broadband network. In implementations in which the audio output unit 205 includes a speaker and/or the panic button device 200 includes the microphone 285, the fourth communications unit 235 can transmit voice signals to the network and/or audibly output voice signals received from the network.

In many implementations, one or more of the communications units include a plurality of contacts. In several implementations, the one or more of the communications units are the first communications unit 220 and/or the fourth communications unit 235. Each of the plurality of contacts is to contact a respective Subscriber Identity Module (SIM). Thus, the first communications unit 220 and/or the fourth communications unit 235 can communicates via a respective one of the plurality of SIMs.

The physical attachment unit 240 is a unit by which the panic button device 200 can be worn by a person or attached to a physical object. The physical attachment unit 240 can be or include a lug, a hole, a clip, and/or a holster. In addition, the physical attachment unit 240 can be or include a pin and/or a magnet.

The processor 245 can be or include any digital, analog, and/or quantum circuit that can execute instructions to perform operations. For example, the processor 245 can perform the operations on data retrieved from the memory 210. In many implementations, these operations are illustrated in one or more of FIGS. 3-6. In select implementations, the processor can perform a timer operation, such as for the heartbeat expiration and phone home expiration discussed with regard to FIG. 5, below. Additionally, the processor 245 can encrypt and/or decrypt communications performed via the first communications unit 220, the second communications unit 225, the third communications unit 230, and/or the fourth communications unit 235.

The processor 245 can be or include a central processing unit (CPU), graphics processing unit (GPU), neural processing unit (NPU), digital signal processor (DSP), physics processing unit (PPU), and/or field-programmable gate array (FPGA).

The device ID unit 250 stores identification data identifying the panic button device 200. The device ID unit can be or include a bar code and/or a Read Only Memory (ROM). The identification data can be encoded within the bar code. The identification data can be stored in the ROM. In some implementations, the processor 245 can retrieve the identification data from the device ID unit 250, and the communications units 220, 225, 230, 235 can transmit the identification data.

The haptic motor 255 can be or include a vibration motor. In many implementations, the vibration motor includes an asymmetric mass. The haptic motor 255 can vibrate with sufficient force so that its vibrations can be perceived by a human wearing the panic button device 200. The haptic motor can be activated to vibrate silently. In many implementations, the motor can be activated at multiple intensities, at least one of which can be audible.

The first button 260 can be a button on the front face (e.g., the face having or opposing the face having the largest planar area) of the panic button device 200. In many implementations, the first button 260 is a hardware button. In some implementations, the first button 260 is a software button displayed, e.g., on the display 280. In several implementations, pressing the first button 260 performs a panic button operation, rather than a system maintenance operation (e.g., powering up or powering down). However, operation of the first button 260 can be configured by the management server 150.

The second button 265 can be a button on a side of the panic button device 200. For example, the second button 265 on a face of the panic button device 200 that is perpendicular to the front face. In many implementations, the second button 265 is on a face of the panic button device 200 having the smallest planar area. In many implementations, the second button 260 is a hardware button. In some implementations, the second button 260 is a software button displayed, e.g., on the display 280. In several implementations, pressing the second button 265 performs a system maintenance operation (e.g., powering up or powering down), rather than a panic button operation. However, operation of the second button 265 can be configured by the management server 150.

The LED 270 can be triggered by the processor 245 to emit light indicating a state of operation. The LED 270 can be or include one or more LEDs. In implementations in which the LED 270 is or includes plural LEDs, the LEDs can be the same colors or different colors. The color of the LED 270 can be controlled by the processor 245. The LED 270 can emit a continuous light or can be flashed momentarily.

In implementations in which the LED 270 is or includes plural LEDs, the processor 245 can illuminate the LEDs in a progressive order. For example, one LED can be lit in an idle state to indicate the panic button device 200 is powered-on, two LEDs can be lit in a first emergency state (e.g., medical assistance required), and three LEDs can be lit in a second emergency state (e.g., an active shooter). As another progressive order, a green LED can be lit to indicate an idle state, a yellow LED can be lit in the first emergency state, and a red LED can be lit in the third emergency state. The number and color of the plural LEDs lit in each stage can be configured by the management server 150.

The optional camera 275 includes a lens and a light sensor. In some implementations, the camera 275 captures pictures of the environment surrounding the panic button device 200. In select implementations, the camera 275 can capture an image, upon activation of the first button 260 or the second button 265. In some implementations, the camera 275 can capture video upon a receiving a command from the management server 150.

The optional display 280 displays a picture or a text message. The picture or text message can be received by communications units 220, 225, 230, 235. In implementations including the camera 275, the display 280 can display a picture taken by the camera 275. The display 280 can display information (e.g., name, class, teacher, office number) of the user of the panic button device 200. In some implementations, the display 280 can display a map, floorplans, emergency operation plans, and/or a role-specific emergency response checklist for, e.g., reunification with other class or office members.

The optional microphone 285 is or includes a pressure sensor that receives an audio input. In some implementations, the microphone 285 begins or ends recording of the audio input, upon activation of the first button 260 or the second button 265. In various implementations, the microphone 285 can capture an audio signal upon receiving a command from the management server 150.

In select implementations, the processor 245 can record a voice message with the microphone 285. The communications units 220, 225, 230, 235 can transmit the voice message. In some implementations, the communications units 220, 225, 230, 235 can participate in a Voice over Internet Protocol (VoIP) call, at least in part based on the audio input received by the microphone 285 and/or the audio output produced by the audio output unit 205.

The thermometer 290 is a temperature sensor to sense the temperature outside the panic button device 200. The thermometer 290 can capture a temperature reading, upon activation of the first button 260 or the second button 265. In addition, the thermometer 290 can capture a temperature reading upon receiving a command from the management server 150. The panic button device 200 can transmit a temperature reading from the thermometer 290 via the communications units 220, 225, 230, 235.

The barometer 295 is a pressure sensor to sense the air pressure outside the panic button device 200. The barometer 295 can capture a pressure reading, upon activation of the first button 260 or the second button 265. In addition, the barometer 295 can capture a pressure reading upon receiving a command from the management server 150. The panic button device 200 can transmit a pressure reading from the thermometer 290 via the communications units 220, 225, 230, 235.

Figure 3:
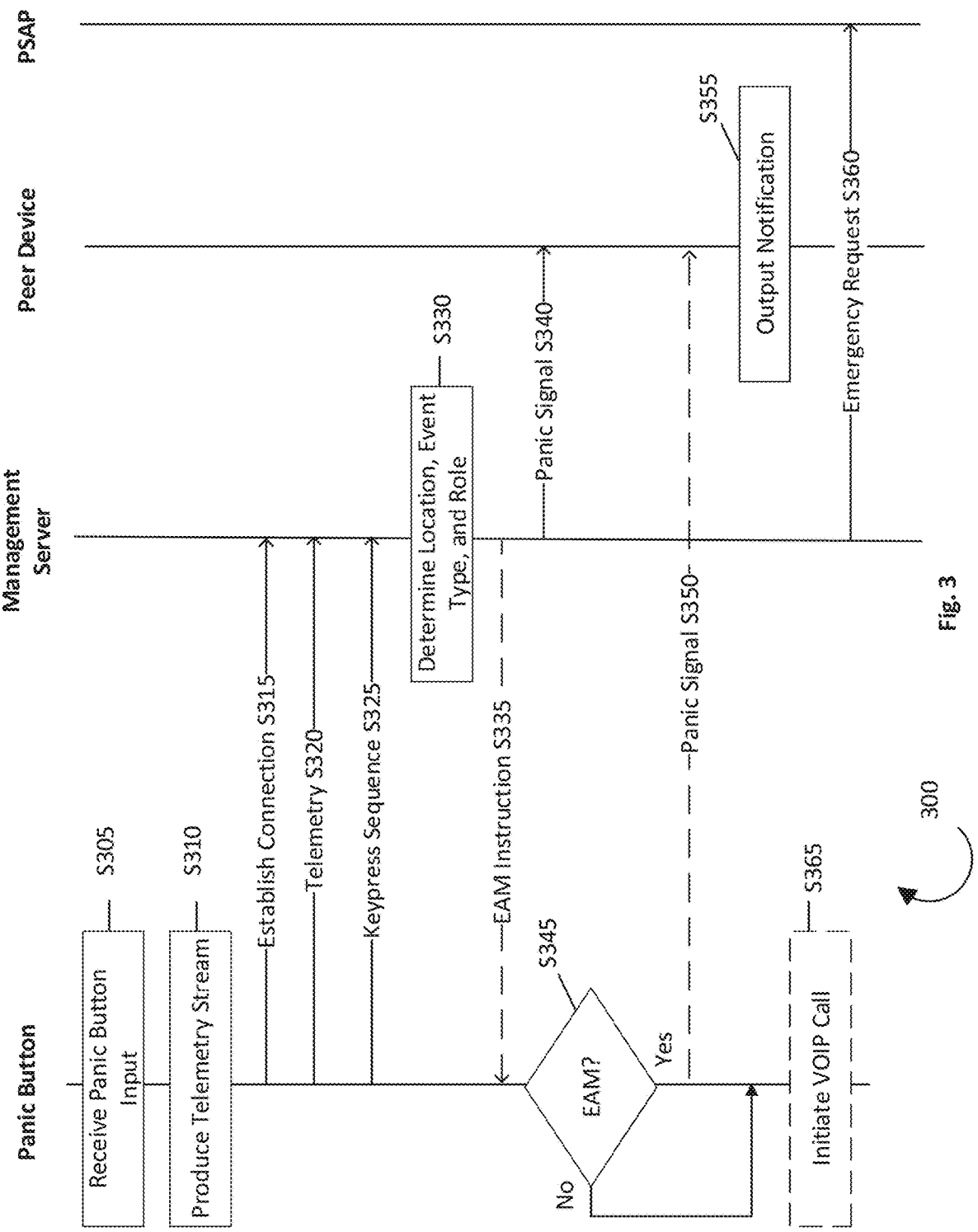
FIG. 3 illustrates a signal flow upon receiving a panic button input at a panic button device, according to an implementation of the present disclosure.

FIG. 3 illustrates a signal flow 300 upon receiving a panic button input at a panic button device 120, according to an implementation of the present disclosure.

The signal flow 300 begins at S305 in which the panic button device 120 receives an input on the first button 260 and/or the second button 265. The input can be or include one or more presses, and the presses can be on one or both of the first button 260 and the second button 265. If the input is or includes one or more presses on both the first button 260 and the second button 265, then the one or more presses can be simultaneous or sequential.

The processor 245 determines that the input is the panic button sequence. The panic button sequence is configurable in many implementations. The signal flow 300 then advances to S310.

In S310, the processor 245 can turn on one or more of communication units 220, 225, 230, 235, optional camera 275, optional microphone 285, thermometer 290, and barometer 295. Thus, the processor can receive information from these devices. Based thereon, the processor 245 can produce a telemetry stream. This telemetry stream can include, for example, a position of the panic button device 200 received the third communications unit 230, a photograph or video of the environment captured by the camera 265, an audio recording of the environment captured by microphone 285, a temperature reading performed with thermometer 290, and/or a pressure reading performed by the barometer 295. The telemetry stream can include additional information as well.

The signal flow 300 then advances to S315.

In S315, the panic button device 120 establishes a connection with the management server 150. In many implementations, the connection from the panic button device 120 is established via the first communications unit 220 and/or the second communications unit 225. In various implementations, the connection from the management server 150 is established via a network interface. In some implementations, the connection between the panic button device 120 and the management server 150 is established via the beacon 110.

The signal flow 300 then advances to S320.

In S320, the panic button device 120 transmits the telemetry data produced in S310 to the management server 150. In many implementations, this telemetry is transmitted via the first communications unit 220 and/or the second communications unit 225. In many implementations, the telemetry data includes the panic button input sequence received at S305 and an identifier of the panic button device 120 from the device ID unit 250. The management server 150 receives the telemetry data.

The signal flow 300 then advances to S325.

In S325, the management server 150 determines a location of the panic button device 120 and the event type. In many implementations, this determination is at least in part based on the telemetry data received by the management server in S320. For example, the management server 150 can determine the event type based on the sequence of button presses received by the first button 260 and/or the second button 265 in S305. The management server 150 can also determine that the event type is a fire, based on the temperature reading in the telemetry data. In some implementations, the management server 150 can determine the event type based on a picture received from the camera 265 or an audio recording received from the microphone 285. For example, the management server 150 can perform voice recognition on an audio recording to determine a speaker said the word "fire."

The management server 150 can determine the location of the panic button device 120 based on, e.g., data received by the panic button device 120 from the third communications unit 230. In some implementations, the management server 150 can determine the location of the panic button device 120 based on an identity of the beacon no. For example, if the beacon no forwards the telemetry data along with an identity of itself, then the management server 150 can determine the location of the beacon no by looking up the location of the beacon no in a database, at least in part based on the identity of the beacon no. In some implementations, the server 150 can triangulate the location of the panic button device 120, based on identifications of three or more beacons.

The management server 150 can determine a role (e.g., teacher, student, visitor, safety personnel), based on the identifier of the panic button device 120. The management server 150 can determine an emergency checklist, based on the event type and the role.

The signal flow 300 then advances to S335.

In S335, the management server 150 optionally transmits an emergency alert message (EAM) instruction to the panic button device 120. The panic button device 120 receives the EAM instruction. The EAM instruction can include or indicate the role-specific emergency checklist. The EAM instruction also can indicate a false alarm.

The signal flow 300 then advances to S340.

In S340, the management server 150 sends a panic signal. The panic signal is received by the peer device 140.

The signal flow 300 then advances to S345. Although the implementation of FIG. 3 illustrates S335 as occurring before S340 and S340 as enumerated ahead of S345, these operations are not necessarily performed in this order. For example, S340 can be performed before or in parallel to S335 and S345.

In S345, the panic button device 120 determines whether an EAM instruction has been received. If the panic button device 120 determines that the EAM instruction has been received, then the signal flow 300 advances to S350. If the panic button device 120 determines that the EAM instruction has not been received, then the signal flow 300 advances to S365.

In S350, the panic button device 120 optionally transmits a panic signal using the second communications unit 225, for example.

In S355, the peer device 140 receives the panic signal using a second communications unit 225, for example. The panic signal can include one or more instructions. The operations of the peer device 140 are similar to those set forth with regard to the panic button device 120 in FIG. 4, discussed below.

In S360, the management server 150 can determine to transmit a panic signal based on the event type. The signal can include location details, incident details, and a floor plan.

In S365, the panic button device 120 optionally initiates a voice over Internet protocol (VOIP) call. The panic button device 120 can perform the VOIP call using the first communications unit 220 or the fourth communications unit 235 in many implementations.

In S370, the panic button device 120 optionally sends an emergency request. In many implementations, this emergency request is transmitted by the fourth communications unit 235. The emergency request can include telemetry data and/or an event type.

The signal flow 300 then concludes.

Figure 4:
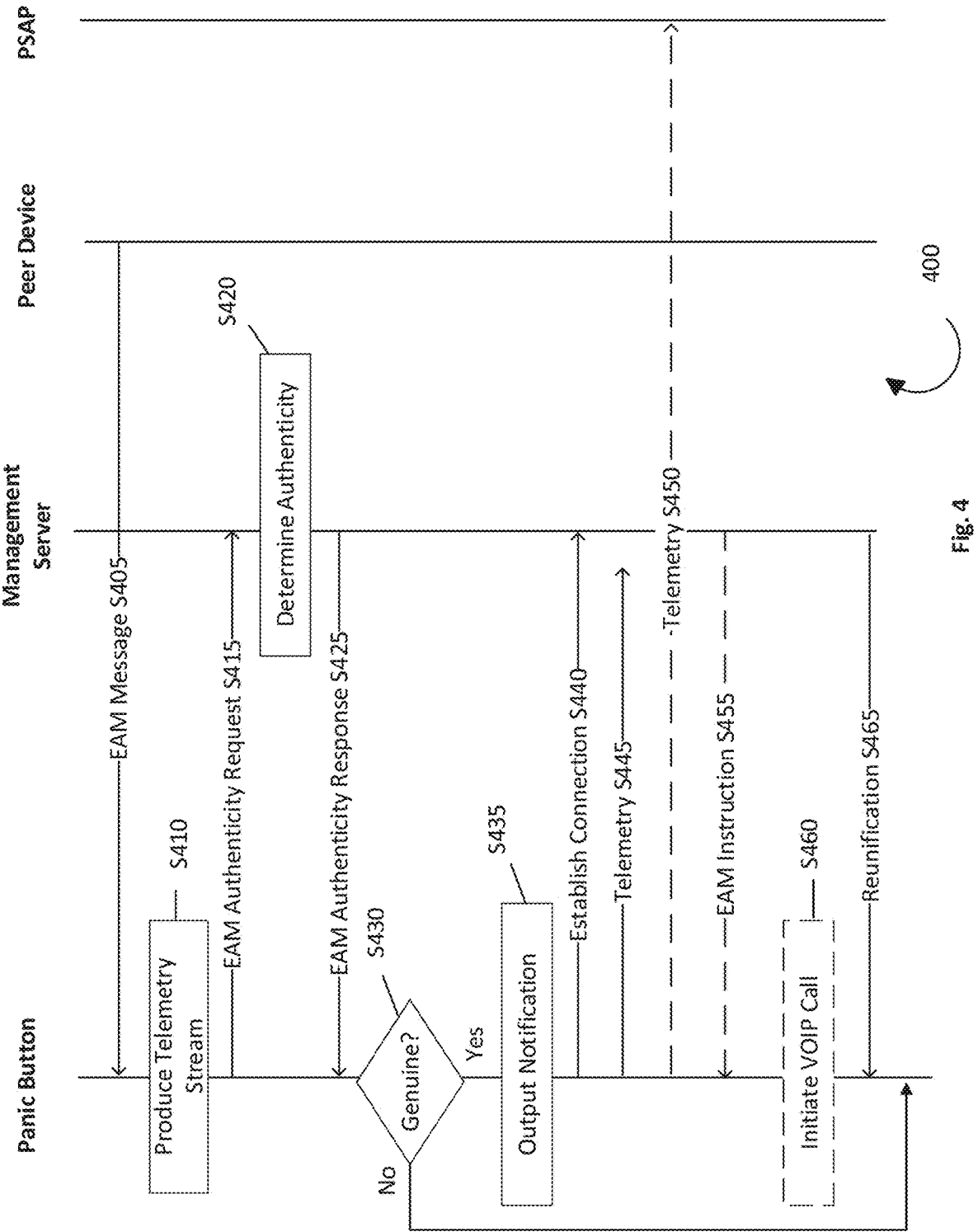
FIG. 4 illustrates a signal flow upon receiving a panic button input at a peer device, according to an implementation of the present disclosure.

FIG. 4 illustrates a signal flow 400 upon receiving a panic button input at a peer device 140, according to an implementation of the present disclosure.

The signal flow 400 begins at S405 in which the panic button device 120 receives an EAM message. The peer device 140 can transmit the EAM message, for example. The signal flow 400 then advances to S410.

In S410, the panic button device 120 produces a telemetry stream, at least in part based on a determination that the EAM has been received. For example, the panic button device 120 can activate and record data with a sensor, such as the camera 275, the display 280, the microphone 285, the thermometer 290, and/or the barometer 295. The telemetry stream can indicate or include the device ID, as well as the recorded data. The signal flow 400 then advances to S415.

In S415, the panic button device 420 transmits an EAM authenticity request. The EAM authenticity request can include the telemetry stream. The management server 150 can receive the EAM authenticity request. The signal flow 400 then advances to S420.

In S420, the management server determines whether there is an active emergency or if the EAM message received by the panic button device 120 was the product of a bad actor (e.g., a false alarm). The signal flow 400 then advances to S425.

In S425, the management server 150 transmits an EAM authenticity response. The panic button device 120 can receive the EAM authenticity response. The EAM authenticity response indicates to the panic button device 120 whether the EAM message received in S405 is genuine and the type of the emergency. The signal flow 400 then advances to S430.

In S430, the panic button device 120 determines whether the EAM message received in S405 is genuine, at least in part based on the EAM authenticity response. If the panic button device 120 determines that the EAM message is not genuine, then the signal flow 400 ends. If the panic button device 120 determines that the EAM message is genuine, then the signal flow 400 then advances to S435.

In S435, the panic button device 120 can perform one or more operations, at least in part based on the EAM message. For example, the one or more operations can be or include producing a notification with the audio output unit 205, the haptic motor 255, or the LED 270. The signal flow 400 then advances to S440.

In S440, the panic button device 120 sends a connection establishment request. In many implementations, the connection establishment request is sent by the first communications unit 220 or the second communications unit 225. The management server 150 receives the connection establishment request. The connection establishment request can indicate the identity of the panic button device 120. The signal flow 400 then advances to S445.

In S445, the panic button device 120 transmits telemetry data including the data recorded at S415. The management server 150 receives the telemetry data. Thus, the management server 150 can monitor remotely the situation at the panic button device 120.

In S450, the panic button device 120 optionally can transmit the telemetry data to the PSAP 160.

The signal flow 400 then advances to S455.

In S455, the management server 150 optionally can transmit an EAM instruction. The panic button device 120 receives the EAM instruction. The EAM instruction includes one or more instructions.

Based on the one or more instructions, the panic button device 120 performs one or more operations. The one or more operations can be or include, for example, activating the first communications unit 220, the second communications unit 225, the third communications unit 230, and/or the fourth communications unit 235. The one or more operations also can be or include, for example, activating and recording data with the camera 275, the display 280, the microphone 285, the thermometer 290, and/or the barometer 295.

The signal flow 400 then advances to optional S460.

In S460, the panic button device 120 optionally initiates a VOIP call. The operation in S460 is similar to the operation in S365.

In S465, the management server optionally transmits a reunification message. The panic button device 120 receives the reunification message. The reunification message can indicate a procedure to follow and/or a location to which to return, after the completion of the emergency.

The signal flow 400 then concludes.

Figure 5:
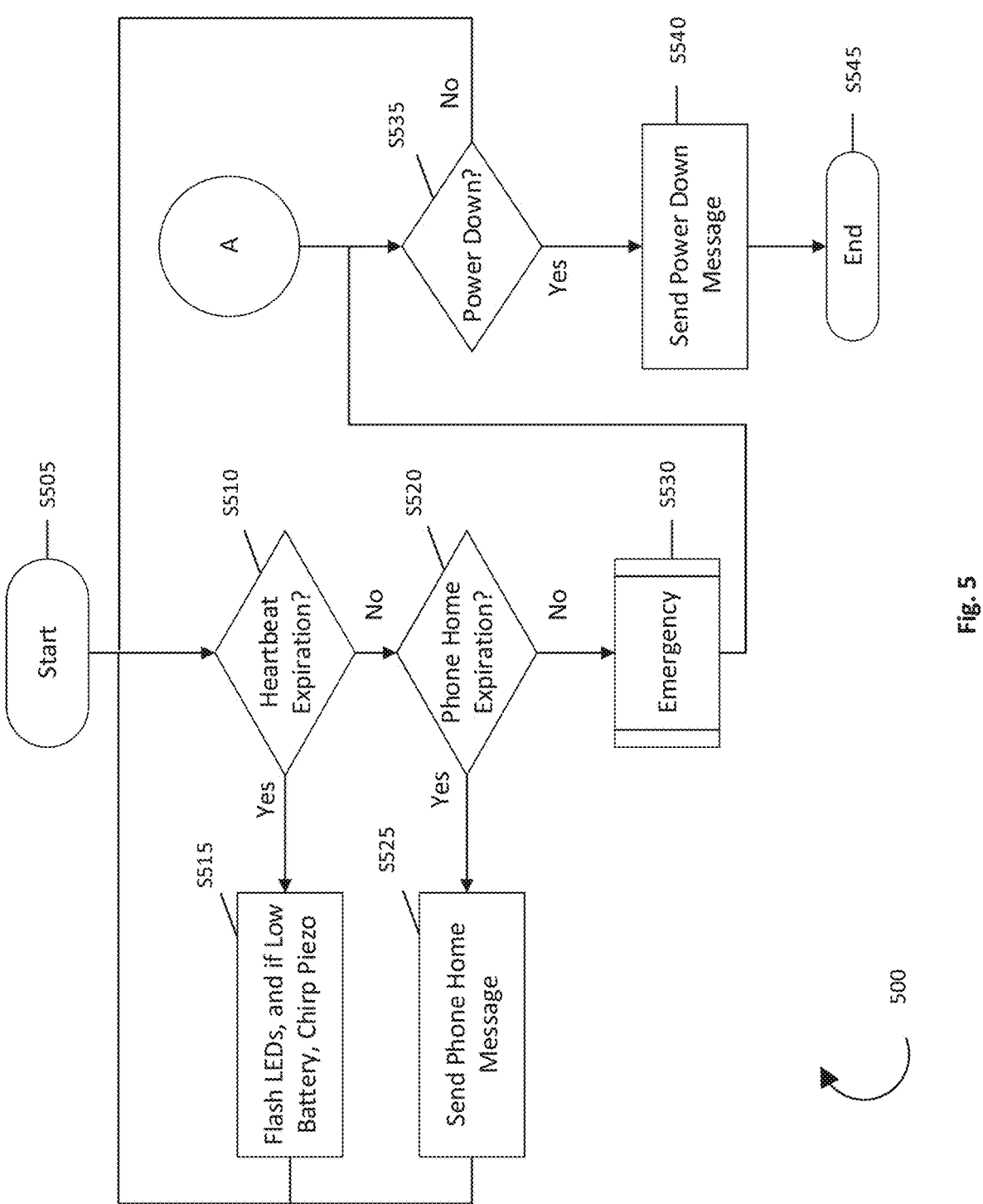
FIG. 5 illustrates a first set of state transitions of the panic button device, according to an implementation of the present disclosure.

FIG. 5 illustrates a first set of state transitions 500 of the panic button device 120, according to an implementation of the present disclosure. The state transitions 500 begin at S505. In some implementations, the processor 245 can initialize and/or reset variables, such as a timer, in S505. The state transitions 500 then advance to S510.

In S510, the panic button device 120 determines whether a heartbeat expiration period has expired. The heartbeat expiration period can be stored in the memory 210, for example. The heartbeat expiration period is configurable by the management server 150 in various implementations. If the panic button device 120 determines the heartbeat expiration period has expired, then the state transitions 500 advance to S515.

In S515, the panic button device 120 flashes one or more of LED 270. This flashing indicates to the user that the panic button device 120 is in an idle mode. However, the energy consumption is reduced, relative to maintaining the LED 270 in an activated state or notifying the user using the haptic motor 255. In addition, the panic button device 120 can determine whether the battery 215 is low. If the panic button device 120 determines the battery 215 is low, then the panic button device 215 can activate to the speaker 205 (e.g., to emit a chirp sound). The state transitions 500 then return to S510.

Returning to S510, if the panic button device 120 determines the heartbeat expiration period has not expired, then the state transitions 500 advance to S520.

In S520, the panic button device 120 determines whether a phone home expiration period has expired. The phone home expiration period can be stored in the memory 210, for example. The phone home expiration period is configurable by the management server 150 in various implementations. If the panic button device 120 determines the phone home expiration period has expired, then the state transitions advance to S525.

In S525, the panic button device 120 transmits a phone home message. The phone home message can be received by the management server 150, for example. The phone home message can include an indication and telemetry data. The indication can indicate that the phone home message is a scheduled phone home message. The telemetry data can indicate or include an identity of the panic button device 120, a location of the panic button device 120, and/or a battery status of the panic button device 120. The panic button device 120 can transmit the phone home message via the first communications unit 220 and/or the second communications unit 225 in several implementations. The state transitions 500 then return to S510.

Returning to S520, if panic button device 120 determines the phone home period expiration has not expired, then the state transitions 500 advance to S530. In S530, the panic button device 120 performs an emergency operation. The suboperations of the emergency operation are discuss below with regard to FIG. 6. The state transitions 500 then advance to S535.

In S535, the panic button device 120 determines whether the first button 260 and/or the second button 265 have received a power down input. The power down input can be stored in the memory 210 and can be configured by the management server 150. If the panic button device 120 determines that the power down input has not been received, then the state transitions 500 return to S510. If the panic button device 120 determines that the power down input has been received, then the state transitions 500 advance to S540.

In S540, the panic button device 120 transmits a power down message. The power down message can be received by the management server 150, for example. The power down message can include an indication and telemetry data. The indication can indicate that the power down message is a power down message. The telemetry data can include an identity of the panic button device 120, a location of the panic button device 120, and/or a battery status of the panic button device 120. The panic button device 120 can transmit the power down message via the first communications unit 220 and/or the second communications unit 225 in several implementations.

The state transitions 500 then advance to S545 and conclude.

Figure 6:
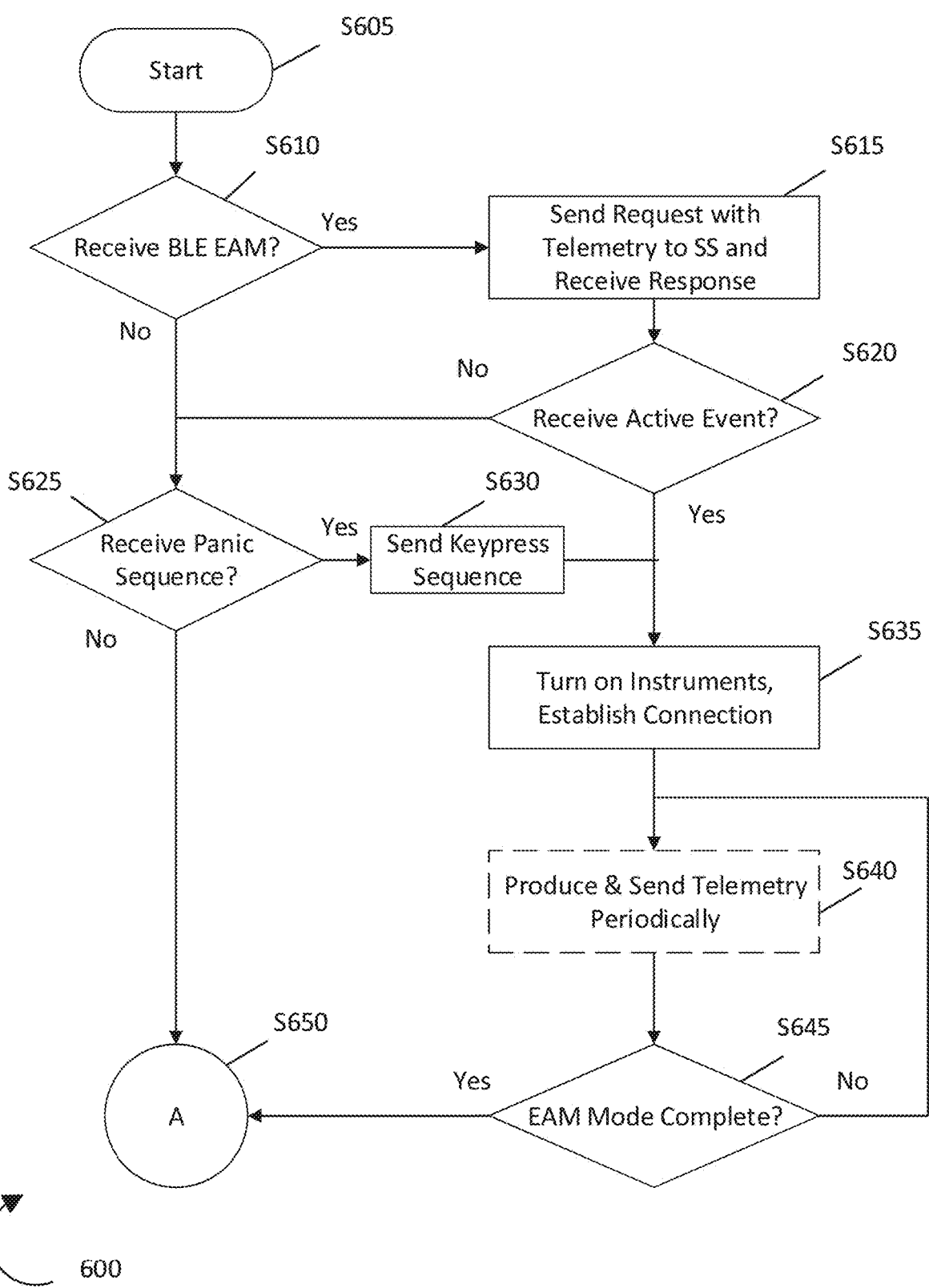
FIG. 6 illustrates suboperations of an emergency state, according to an implementation of the present disclosure.

FIG. 6 illustrates the suboperations 600 of the emergency state of S520, according to an implementation of the present disclosure. The suboperations begin at S605 and advance to S610.

In S610, the panic button device 120 determines whether a BLE EAM has been received. In many implementations, the BLE EAM is received via the second communications unit 225. In several implementations, the BLE EAM can originate from the peer device 140 and/or the management server 150. If the panic button device 120 determines that the BLE EAM has been received, then the suboperations 600 advance to S615.

In S615, the panic button device 120 transmits the EAM authenticity request. The EAM authenticity request can be received by the management server 150, for example. The EAM authenticity request can include an indication and telemetry data. The indication can indicate that the EAM authenticity request is an EAM authenticity request message. The telemetry data can include an identity of the panic button device 120, a location of the panic button device 120, and/or a battery status of the panic button device 120. The panic button device 120 can transmit the EAM authenticity request via the first communications unit 220, the second communications unit 225, and/or the fourth communications unit 235 in several implementations.

The management server 150 can perform a determination whether it had received an EAM message from the peer device 140 and/or transmitted an EAM message to the panic button device 120 and/or the peer device 140. The management server 150 transmits the EAM authenticity response, at least in part based on the determination. The panic button device 120 receives the EAM authenticity response. The suboperations 600 then advance to S620.

In S620, the panic button device 120 determines whether there is an active emergency event, at least in part based on the EAM authenticity response. If the panic button device 120 determines that there is not an active emergency event, then the suboperations 600 advance to S625. If the panic button device 120 determines that there is an active emergency request, then the panic button device 120 can begin an event timer and the suboperations 600 advance to S635.

Briefly returning to S610, if the panic button device 120 determines that a BLE EAM has not been received, then the suboperations 600 advance to S625.

In S625, the panic button device 120 determines whether the first button 260 and/or the second button 265 have received a panic sequence. In at least one implementation, the panic sequence is as simple as a tap on the first button 260 or the second button 265. In many implementations, the panic sequence involves presses on both buttons and/or presses exceeding a predetermined duration. The panic sequence can be configured by the management server 150 and can be stored in the memory 210. If the panic button device 120 determines that the panic sequence has not been received, then the suboperations 600 advance to S650. If the panic button device 120 determines that the panic sequence has been received, then the suboperations 600 advance to S630.

In S630, the panic button device 120 transmits the panic sequence. The panic sequence can be received by the management server 150. The panic sequence can be transmitted by the first communications unit 220, the second communications unit 225, and/or the fourth communications unit 235. The suboperations 600 then advance to S635.

In S635, the panic button device 120 enters into EAM mode, in which the panic button device 120 turns on at least one instrument and establishes a connection. The at least instrument can be or include at least one of the first communications unit 220, the second communications unit 225, the third communications unit 230, and/or the fourth communications unit 235. The at least instrument also can be or include the camera 275, the microphone 285, the thermometer 290, and/or the barometer 295. If the panic button device 120 received a BLE EAM in S610, then the panic button device 120 can determine the at least one instrument, at least in part based on the BLE EAM. If the panic button device 120 received a panic sequence in S625, then the panic button device 120 can determine the at least one instrument, at least in part based on a configuration stored in the memory 210.

In addition, the panic button device 120 establishes a connection with the management server 150. This connection can be establishes via the first communications unit 220, the second communications unit 225, and/or the fourth communications unit 235, in many implementations. The suboperations 600 then advance to S640.

In S640, the panic button device 120 optionally can produce and transmit sensor data, at least in part based on data gathered by the at least one instrument. For example, if the panic button device 120 received an indication of an active event in S620, and the indication indicated for the panic button device 120 to send BLE EAM messages, then the panic button device 120 can determine to transmit the sensor data. The panic button device 120 can transmit telemetry data indicating or including the sensor data. In addition, the telemetry data can indicate or include an identity of the panic button device 120, a location of the panic button device 120, and/or a battery status of the panic button device 120. The telemetry data can be transmitted by the first communications unit 220, the second communications unit 225, and/or the fourth communications unit 235 in many implementations. The suboperations 600 then advance to S645.

In S645, the panic button device 120 determines whether the EAM mode has been completed. For example, the panic button device 120 determines whether the event timer has expired. The duration of the event timer can be included in the EAM authenticity response. In addition or alternatively, the duration of the event timer can be stored in the memory 210. The panic button device 120 can determine that the EAM mode has been completed, if the event timer has expired. In addition or alternatively, the panic button device 120 can determine whether a command has been received indicating the EAM mode should be completed. Such a command can be received via the first communications unit 220, the second communications unit 225, and/or the fourth communications unit 235. The management server 150 can transmit such a command, for example.

If the panic button device 120 determines that the EAM mode has not been completed, the suboperations 600 return to S640. If the panic button device 120 determines that the EAM mode has been completed, then the suboperations 600 advance to S650.

In S650, the suboperations advance to off-page connector A. As illustrated in FIG. 5, the connector A advances to S535.

Figure 7:
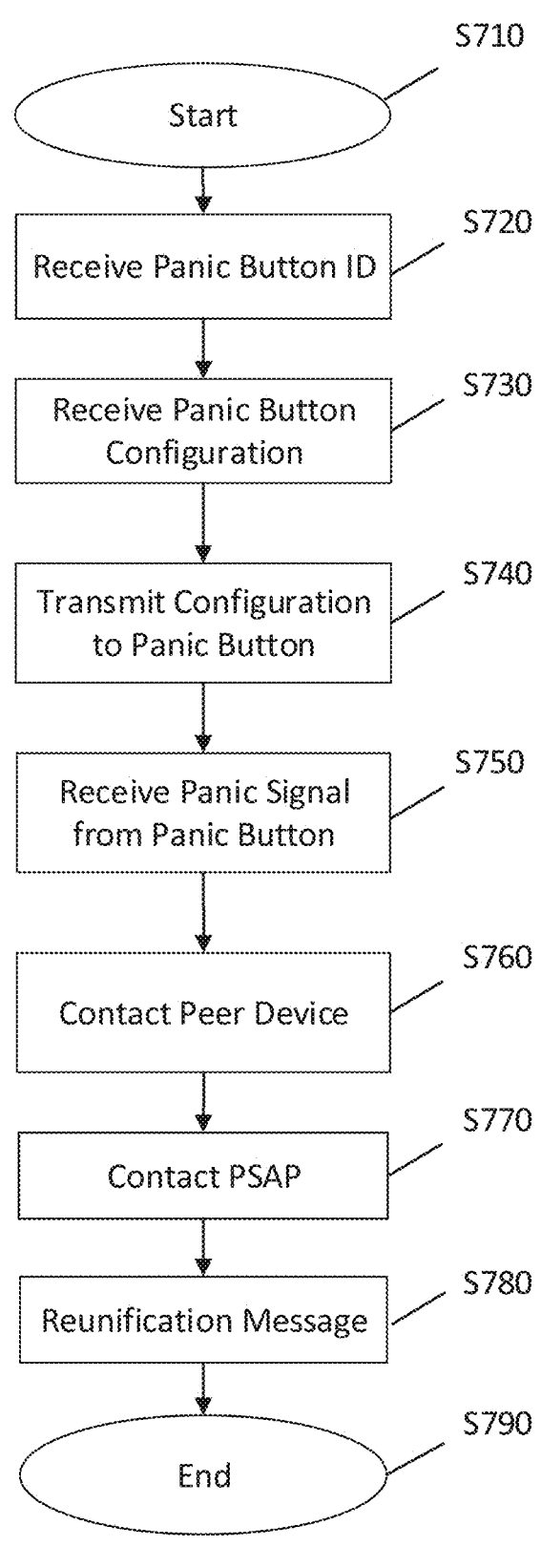
FIG. 7 illustrates an algorithm performed by a management server, according to an implementation of the present disclosure.

FIG. 7 illustrates an algorithm 700 performed by the management server 150, according to an implementation of the present disclosure. The algorithm 700 begins at S710 and advances to S720.

In S720, the management server 150 receives a panic button ID. The panic button ID of the panic button device 120 is distinguishable from a panic button ID of the peer device 140 in many implementations. The panic button ID can be stored in the memory 210 or in the device ID unit 250. In many implementations, the management server 150 displays the panic button ID for visual confirmation. The algorithm 700 then advances to S730.

In S730, the management server 150 receives a panic button configuration via an input interface, such as a keyboard and/or a mouse. In some implementations, the panic button configuration is received via a network interface, such as a modem or wireless connection. The management server 150 can store the panic button configuration in a device database, such as stored in a local memory. The device database can store the panic button ID in association with the panic button configuration.

The panic button configuration can include the heartbeat period, the phone home timer, the event timer, and/or whether the panic button device 120 should transmit BLE EAM messages for an emergency.

The algorithm 700 then advances to S740.

In S740, the management server 150 can perform a transmission of the panic button configuration. The panic button device 120 can receive the panic button configuration. The transmission can be performed via a wired interface and/or via the first communications unit 220, the second communications unit 225, and/or the fourth communications unit 235.

The algorithm 700 then advances to S750.

In S750, the management server 150 receives a panic signal from the panic button device 120. The panic signal can include an indication of the location of the panic button device 120. In some implementations, the indication is a GPS signal, such as received by the third communications unit 230. In select implementations, the indication is an identification of the beacon 110.

In addition, the panic signal can include an indication of an event type. In many implementations, this indication is the key press sequence, such as in S630. In various implementations, this indication is or includes sensor data, such as from the thermometer 290 and/or the barometer 295. The management server 150 can determine that a high temperature indicates that there is a fire. The management server 150 can determine that a low pressure reading indicates there is a tornado.

The sensor data can also be or include a photograph from the camera 275 and/or a sound recording from the microphone 285. In such implementations, the management server 150 can use image recognition to identify a fire. Additionally, the management server 150 can use audio recognition to identify a gun shot or a voice in the audio recording. For example, the management server 150 can identify that the voice is saying an emergency type such as "fire."

The algorithm 700 then advances to S760.

In S760, the management server 150 optionally transmits an EAM message. The peer device 140 can receive the EAM message. In this way, the management server 150 can determine the identity of the peer device 140, based on a location of the peer device 140 reported in a most recent heartbeat message. In various implementations, the management server 150 identifies the beacon 110 as being near the emergency, and the beacon 110 broadcasts the EAM message.

The EAM message can identify whether the peer device 140 is to send BLE EAM messages to another peer device. The EAM message can also instruct the peer device 140 to turn on its instruments and/or to establish a connection with the management server 150. The algorithm 700 then advances to S770.

In S770, the management server 150 transmits an emergency request. The emergency request can be received by the PSAP 160. The emergency request includes the type of emergency, as well as the location of the emergency. In some implementations, the emergency request can also include the identity of the panic button device 120.

The algorithm 700 then advances to S780.

In S780, the management server 150 transmits a reunification message to the panic button device 120.

The algorithm 700 then advances to S790, in which the algorithm 700 concludes.

The various configurations discussed in this disclosure address state and federal Enterprise E911 regulations and Alyssa's Law compliance.

Figure 8:
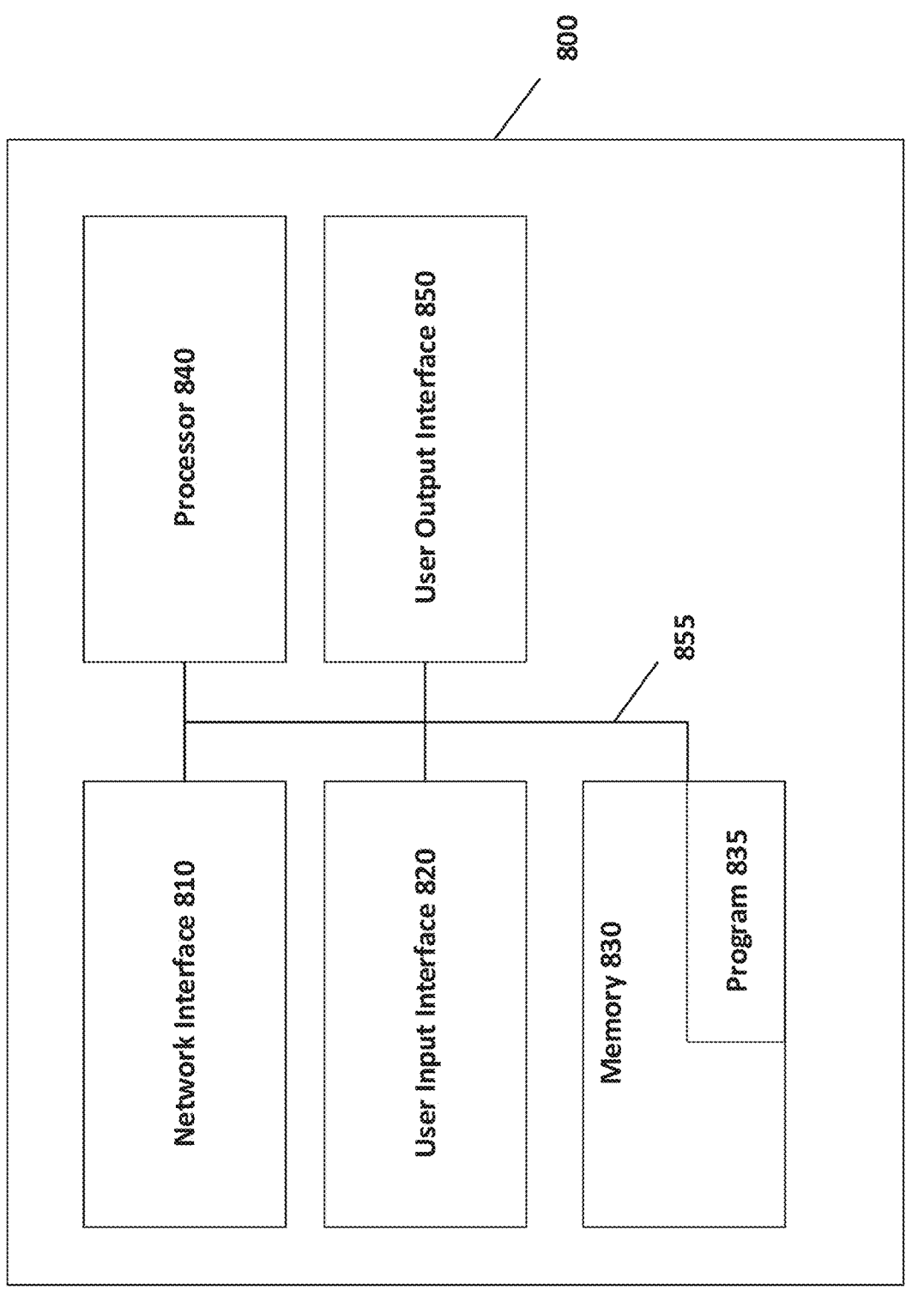
FIG. 8 illustrates a computing device, according to an implementation of the present disclosure.

FIG. 8 illustrates a computing device 800, according to an implementation of the present disclosure.

Although illustrated within a single housing, the computing device 800 can be distributed across plural housings or sub-systems that cooperate in executing program instructions. In some implementations, the computing device 800 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones (e.g., phablets), and other computing devices. Although the system executes the Windows OS in many implementations, the system hardware can be configured according to a Symmetric Multi-Processing (SMP) architecture or a Non-Uniform Memory Access (NUMA) architecture.

The computing device 800 can include a network interface 810, a user input interface 820, a memory 830, a processor 840, a user output interface 850, and a bus 855.

The network interface 810 provides one or more communication connections and/or one or more devices that allow for communication between the computing device 800 and other computing systems (not shown) over a communication network, a collection of networks (not shown), or the air. The network interface can communicate using near-field communications (NFC), Wi-Fi™, Bluetooth, Ethernet, cellular (e.g., 5G), facsimile, or any other wired or wireless interface.

The user input interface 820 can receive one or more inputs from a human. The user input interface 820 can be or include a mouse, a touchpad, a keyboard, a touchscreen, a trackball, a camera, a microphone, a joystick, a game controller, a scanner, or any other input device.

The memory 830, also termed a "storage," can be or include one or more computer-readable storage media readable by the processor 840. The memory 830 can store software, such as a program 835. The memory 830 can be implemented as one storage device and can also be implemented across multiple co-located or distributed storage devices or sub-systems. The memory 830 can include additional elements, such as a controller, that communicate with the processor 840. The memory 830 can also include storage devices and/or sub-systems on which data and/or instructions are stored. The computing device 800 can access one or more storage resources to access information to carry out any of the processes indicated in this disclosure and, in particular, in FIGS. 3-7.

The memory 830 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 830 can be or include resistive RAM (RRAM) or a magneto-resistive RAM (MRAM).

The program 835 stored in the memory 830 can include routines for at least partially performing at least one of the processes illustrated in FIGS. 3-7 and can be implemented in program instructions. Further, the program 835, when executed by the computing device 800 in general or the processor 840 specifically, can direct, among other functions, the computing device 800 or the processor 840 to perform operations of the panic button, management server, peer device, and/or PSAP, as described herein.

The processor 840 (e.g., a processing unit) can be or include one or more hardware processors and/or other circuitry that retrieve and execute the program 835 from memory 830. The processor 840 can be implemented within one processing device, chip, or package and can also be distributed across multiple processing devices, chips, packages, or sub-systems that cooperate in executing program instructions. In some implementations, the processor 840 is or includes a Graphics Processing Unit (GPU).

The processor 840 can have any register size, such as a 32-bit register or a 64-bit register, among others. The processor 840 can include multiple cores. Implementations of the processor 840 are not limited to any particular number of threads. The processor 840 can be fabricated by any process technology, such as 14 nm process technology.

The user output interface 850 outputs information to a human user. The user output interface 850 can be or include a display (e.g., a screen), a touchscreen, speakers, a printer, or a haptic feedback unit. In many implementations, the user output interface 850 can be combined with the user input interface 820. For example, some implementations include a touchscreen or headset including headphones and a microphone.

In implementations including multiple computing devices, a server of the system or, in a serverless implementation, a peer can use one or more communications networks that facilitate communication among the computing devices. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the panic button, management server, peer device, and/or PSAP can be implemented in various manners (e.g., as a method, a system, a computer program product, or one or more computer-readable storage media). Accordingly, aspects of the present disclosure can take the form of a hardware implementation, a software implementation (including firmware, resident software, or microcode) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the algorithms described can be performed by different processing units. Furthermore, aspects of the present disclosure can take the form of a computer program product embodied in one or more computer-readable media having computer-readable program code embodied, e.g., encoded or stored, thereon. In various implementations, devices and systems can download or update such a computer program or can store the program upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve a developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. One or more non-transitory, computer-readable storage media can include software or firmware instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application-specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In certain cases, it might have been clearer to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method is implemented by an apparatus and includes receiving a configuration; receiving a panic signal; receiving an input; measuring a physical attribute to produce sensor data; determining an occurrence of an emergency event, at least in part based on the configuration and the input; transmitting telemetry data indicating the sensor data, at least in part based on the occurrence of the emergency event; and outputting an audio, visual, or haptic output, at least in part based on the panic signal.

Example M2 is the method of Example M1, further comprising: transmitting an authenticity request indicating the sensor data, if the panic signal is received.

Example M3 is the method of Example M2, further comprising: receiving an authenticity response, wherein the audio, visual, or haptic output is output, at least in part based on the authenticity response.

Example M4 is the method of any of Examples M2-M3, wherein the panic signal is received via a personal area network technology, and the authenticity request is transmitted, at least in part based on the panic signal.

Example M5 is the method of any of Examples M1-M4, further comprising: transmitting a device ID of the apparatus, at least in part based on the occurrence of the emergency event, wherein the apparatus stores the device ID.

Example M6 is the method of any of Examples M1-M5, wherein the telemetry data is transmitted, if the panic signal is received.

Example M7 is the method of any of Examples M1-M6, wherein the telemetry data is transmitted, if a predetermined period is determined to have expired.

Example A1 is an apparatus including a wireless network interface that receives a configuration and receives a panic signal; a button that receives an input; a sensor that measures a physical attribute to produce sensor data; a processor configured to determine an occurrence of an emergency event, at least in part based on the configuration and the input, wherein the wireless network interface transmits telemetry data indicating the sensor data, at least in part based on the occurrence of the emergency event; and an output interface that outputs an audio, visual, or haptic output, at least in part based on the panic signal.

Example A2 is the apparatus of Example A1, wherein the wireless network interface transmits an authenticity request indicating the sensor data, if the wireless network interface receives the panic signal.

Example A3 is the apparatus of Example A2, wherein the wireless network interface receives an authenticity response, and the output interface outputs the audio, visual, or haptic output, at least in part based on the authenticity response.

Example A4 is the apparatus of any of Examples A2-A3, wherein the wireless network interface receives the panic signal via a personal area network technology, and the wireless network interface transmits the authenticity request, at least in part based on the panic signal.

Example A5 is the apparatus of any of Examples A1-A4, further comprising: a memory that stores a device ID of the apparatus, wherein the wireless network interface transmits the device ID, at least in part based on the occurrence of the emergency event.

Example A6 is the apparatus of any of Examples A1-A5, wherein the wireless network interface transmits the telemetry data, if the wireless network interface receives the panic signal.

Example A7 is the apparatus of any of Examples A1-A6, wherein the wireless network interface transmits the telemetry data, if the processor determines that a predetermined period has expired.

Example C1 is a computer-readable medium including instructions that, when executed by a processing unit, perform operations comprising: receiving a configuration; receiving a panic signal; receiving an input; measuring a physical attribute to produce sensor data; determining an occurrence of an emergency event, at least in part based on the configuration and the input; transmitting telemetry data indicating the sensor data, at least in part based on the occurrence of the emergency event; and outputting an audio, visual, or haptic output, at least in part based on the panic signal.

Example C2 is the medium of Example C1, the operations further comprising: transmitting an authenticity request indicating the sensor data, if the panic signal is received.

Example C3 is the medium of Example C2, the operations further comprising: receiving an authenticity response, wherein the audio, visual, or haptic output is output, at least in part based on the authenticity response.

Example C4 is the medium of any of Examples C2-C3, wherein the panic signal is received via a personal area network technology, and the authenticity request is transmitted, at least in part based on the panic signal.

Example C5 is the medium of any of Examples C1-C4, the operations further comprising: transmitting a device ID of an apparatus, at least in part based on the occurrence of the emergency event, wherein the apparatus includes the processing unit, and the apparatus stores the device ID.

Example C6 is the medium of any of Examples C1-C5, wherein the telemetry data is transmitted, if the panic signal is received.

Example C7 is the medium of any of Examples C1-C6, wherein the telemetry data is transmitted, if a predetermined period is determined to have expired.

In Example F1, an apparatus includes means for receiving a configuration, for receiving a panic signal, and for receiving an input; means for measuring a physical attribute to produce sensor data; means for determining an occurrence of an emergency event, at least in part based on the configuration and the input, wherein the means for receiving transmits telemetry data indicating the sensor data, at least in part based on the occurrence of the emergency event; and means for outputting an audio, visual, or haptic output, at least in part based on the panic signal.

Example F2 is the apparatus of Example F1, wherein the means for receiving transmits an authenticity request indicating the sensor data, if the panic signal is received.

Example F3 is the apparatus of Example F2, wherein the means for receiving receives an authenticity response, and the audio, visual, or haptic output is output, at least in part based on the authenticity response.

Example F4 is the apparatus of any of Examples F2-F3, wherein the panic signal is received via a personal area network technology, and the authenticity request is transmitted, at least in part based on the panic signal.

Example F5 is the apparatus of any of Examples F1-F4, further comprising: means for storing a device ID of the apparatus, wherein the means for receiving transmits a device ID of the apparatus, at least in part based on the occurrence of the emergency event.

Example F6 is the apparatus of any of Examples F1-F5, wherein the telemetry data is transmitted, if the panic signal is received.

Example F7 is the apparatus of any of Examples F1-F6, wherein the telemetry data is transmitted, if a predetermined period is determined to have expired.

We claim:

1. A method implemented by an apparatus, the method comprising:
   receiving a configuration;
   receiving a panic signal via a personal area network technology;
   receiving an input;
   measuring a physical attribute to produce sensor data;
   determining an occurrence of an emergency event, at least in part based on the configuration and the input;
   transmitting telemetry data indicating the sensor data, at least in part based on the occurrence of the emergency event;
   transmitting an authenticity request, at least in part based on a reception of the panic signal;
   receiving an authenticity response; and
   outputting an audio, visual, or haptic output, at least in part based on the authenticity response.

2. The method of claim 1, wherein the authenticity request indicates the sensor data.

3. The method of claim 1, further comprising:
   transmitting a device ID of the apparatus, at least in part based on the occurrence of the emergency event, wherein the apparatus stores the device ID.

4. The method of claim 1, wherein the telemetry data is transmitted, if the panic signal is received.

5. The method of claim 1, wherein the telemetry data is transmitted, if a predetermined period is determined to have expired.

6. An apparatus, comprising:
   a wireless network interface that receives a configuration and receives a panic signal via a personal area network technology;
   a button that receives an input;
   a sensor that measures a physical attribute to produce sensor data;
   a processor configured to determine an occurrence of an emergency event, at least in part based on the configuration and the input, wherein
   the wireless network interface transmits telemetry data indicating the sensor data, at least in part based on the occurrence of the emergency event;
   the wireless network interface transmits an authenticity request, at least in part based on a reception of the panic signal;

the wireless network interface receives an authenticity response; and an output interface that outputs an audio, visual, or haptic output, at least in part based on the authenticity response.

7. The apparatus of claim 6, wherein the authenticity request indicates the sensor data.

8. The apparatus of claim 6, further comprising:

a memory that stores a device ID of the apparatus, wherein the wireless network interface transmits the device ID, at least in part based on the occurrence of the emergency event.

9. The apparatus of claim 6, wherein the wireless network interface transmits the telemetry data, if the wireless network interface receives the panic signal.

10. The apparatus of claim 6, wherein the wireless network interface transmits the telemetry data, if the processor determines that a predetermined period has expired.

11. A non-transitory computer-readable medium including instructions that, when executed by a processing unit, perform operations comprising:

receiving a configuration;

receiving a panic signal via a personal area network technology;

receiving an input;

measuring a physical attribute to produce sensor data;

determining an occurrence of an emergency event, at least in part based on the configuration and the input;

transmitting telemetry data indicating the sensor data, at least in part based on the occurrence of the emergency event;

transmitting an authenticity request, at least in part based on a reception of the panic signal;

receiving an authenticity response; and outputting an audio, visual, or haptic output, at least in part based on the authenticity response.

12. The medium of claim 11, wherein the authenticity request indicates the sensor data.

13. The medium of claim 11, wherein the telemetry data is transmitted, if the panic signal is received.

14. The medium of claim 11, wherein the telemetry data is transmitted, if a predetermined period is determined to have expired.

* * * * *